United States Patent
Etter

(10) Patent No.: US 6,530,568 B2
(45) Date of Patent: Mar. 11, 2003

(54) FLUSH-MOUNT CLAMPING DEVICE

(75) Inventor: Ernst Etter, Tahlwil (CH)

(73) Assignee: Vischer & Bolli AG (DE)

( * ) Notice: Subject to any disclaimer, the term of this patent is extended or adjusted under 35 U.S.C. 154(b) by 0 days.

(21) Appl. No.: 09/760,699

(22) Filed: Jan. 17, 2001

(65) Prior Publication Data

US 2001/0022420 A1 Sep. 20, 2001

(30) Foreign Application Priority Data

Jan. 20, 2000 (DE) .......................................... 100 02 395

(51) Int. Cl.⁷ ................................................. B23Q 3/00
(52) U.S. Cl. .................................................... 269/309
(58) Field of Search ................................ 269/309–310, 269/900, 56; 279/4.12, 4.06, 75; 29/559

(56) References Cited

U.S. PATENT DOCUMENTS

| | | | | |
|---|---|---|---|---|
| 5,415,384 A | * | 5/1995 | Obrist et al. ................. | 269/309 |
| 5,918,870 A | * | 7/1999 | Stark ........................... | 269/309 |
| 5,961,261 A | * | 10/1999 | Stark ........................... | 269/309 |
| 6,073,325 A | * | 6/2000 | Stark ........................... | 269/309 |
| 6,160,236 A | * | 12/2000 | Nordquist .................... | 279/4.06 |
| 6,170,836 B1 | * | 1/2001 | Etter ........................... | 279/4.06 |
| 6,273,434 B1 | * | 8/2001 | Stark ........................... | 279/4.06 |

FOREIGN PATENT DOCUMENTS

DE 19901977 8/2000

OTHER PUBLICATIONS

German Pat. Appln. No. 298 11699.5, filed Jul. 1, 1998.
German Pat. Appln. No. 29804730.6, filed Mar. 16, 1998.

* cited by examiner

*Primary Examiner*—Lee Wilson
(74) *Attorney, Agent, or Firm*—Liniak, Berenato & White, LLC

(57) ABSTRACT

A clamping device for securing a draw-in bolt on a machine table or a base plate. The clamping device has a piston axially displaceable in a recess of the machine table and is hydraulically actuable. The clamping device has a cover, which is secured to the machine table in order to close off the recess in the machine table. The piston and the cover form a receptacle into which a draw-in bolt can be inserted through the cover, and in which it can be secured by way of a clamping mechanism actuable by displacement of the piston. The clamping device is characterized in that there is inserted into the machine table recess an integrally configured bushing, in which the piston is held displaceably forming a pressure chamber. The cover is attached to the machine table. The attachment to the machine table is accomplished by way of multiple bolts passing axially through the bushing into the machine table. The bushing and the cover have centering surfaces for positioning on the machine table or base plate.

20 Claims, 1 Drawing Sheet

FLUSH-MOUNT CLAMPING DEVICE

BACKGROUND OF THE INVENTION

1. Field of the Invention

The present invention concerns a clamping device for securing a draw-in bolt on a machine table, a base plate, or the like, having a piston that is arranged axially displaceably in a recess of the machine table and is hydraulically actuable, and having a cover in order to close off the recess in the machine table, the piston and/or the cover forming a receptacle into which a draw-in bolt can be inserted through the cover and in which it can be secured by way of a clamping mechanism actuable by displacement of the piston.

2. Description of the Related Art

The machining of workpieces is often very complex, and can comprise a plurality of chip-generating and non-chip-generating operations on various machine tools in order o to produce the finished component from a blank. In all production sequences, it is essential that the workpiece assume a defined position on the particular machine tool for each operation.

For that purpose, it is usual in practical use first to clamp the workpiece that is to be machined onto a carrier pallet, and then to clamp the entire unit in place onto the respective machine tool by way of multiple draw-in bolts that are provided on the back side of the carrier pallet and are configured as centering elements, by inserting the drawing bolts into corresponding quick clamping units that are provided on the machine table. In this manner, it is possible during production to regard the position of the quick clamping devices as a fixed machine parameter, so that it is necessary only to position each workpiece precisely on the carrier pallet. The actual clamping and reclamping of the unit comprising the workpiece and carrier pallet onto the machines can then be accomplished very quickly and easily with no need for further positioning.

The known mechanical/hydraulic clamping devices from which the present invention proceeds are configured either as so-called surface-mount cylinders, which form closed units and can be clamped onto a machine table, a base plate, or the like (see DE 298 04 730 U1 or DE 298 11 699 U1); or as so-called flush-mount clamp closures, which can be countersunk into the machine tables, quick-closure plates, dies, etc. The known flush-mount clamp closures are inserted directly into a recess of the machine table or into a corresponding base element; a pressure chamber, which can be acted upon by a hydraulic medium in order to disengage the clamping device, is then formed between the piston of the closure and the recess of the machine table.

The use of such flush-mount clamp closures frequently proves problematic because the machine tables often do not possess the necessary casting quality, so that the receptacles cannot be produced with the requisite accuracy and sealing problems thus occur. In addition, the presence of cavities can in some cases greatly impair the service life of the pistons or the clamping devices or the service life of the seals. Moreover, the clamping forces are directed into the machine table, base element, or the like, so that distortion can occur therein.

Lastly, the recesses in the machine table must be machined with great accuracy in order to achieve correspondingly accurate positioning of the clamp closure.

BRIEF SUMMARY OF THE INVENTION

It is therefore the object of the present invention to describe a clamping device of the kind cited initially, suitable for installation in a machine table or the like, which is configured in such a way that it can be installed easily in the machine table without the occurrence of sealing problems, and which is easy to maintain.

This object is achieved, in a clamping device of the kind cited initially, in that there is inserted into the machine table recess an integrally configured bushing in which the piston is held displaceably forming a pressure chamber, the cover being attached on the one hand to the bushing and on the other hand to the machine table, and the attachment to the machine table being accomplished by way of multiple bolts passing axially through the bushing, and the bushing and/or cover having centering surfaces for positioning on the machine table or the like.

Because the clamping device according to the present invention is configured a sealed unit, the sealing problems that arise with the existing art can be eliminated. The clamping device can furthermore be configured as a standardized compact component, so that manufacturing costs can be reduced. If positioning of the clamping device is accomplished by way of the cover, it is necessary only to provide corresponding centers on the machine table and on the cover, with the result that machining inaccuracies in the remaining region of the receptacle play only a limited role. Any annular gap that is possibly present between the receptacle and the bushing is sealed from below against oil or air by way of two O-rings.

The clamping device according to the present invention offers the further advantage that no distortions occur on the machine table during operation, since the clamping or disengagement forces are absorbed entirely within the clamping device. The service life of the clamping devices is moreover greatly increased because, for example, cavities in the machine table have no effect on the operation of the clamping device.

Centering of the cover on the machine table and of the bushing can be accomplished in a variety of ways. It has proven advantageous to provide on the cover a centering extension that engages into the bushing, a sealing element then advantageously being arranged between cover and bushing. For centering of the cover on the machine table, the outer rim of the cover can be configured as a centering rim which forms a fit with a depression provided on the machine table. The cover, in this context, can be countersunk into the machine table at least partially, but in particular completely so that it terminates flush with the table surface. The clamping device is advantageously supplied with a hydraulic medium and optionally with air in the bottom region of the bushing, since sealing between the bushing and receptacle can be most easily accomplished there.

BRIEF DESCRIPTION OF THE DRAWINGS

With regard to further advantageous embodiments of the invention, reference is made to the dependent claims and to the explanation below of an exemplary embodiment referring to the appended drawings, in which:

DETAILED DESCRIPTION OF THE INVENTION

Figure 1:
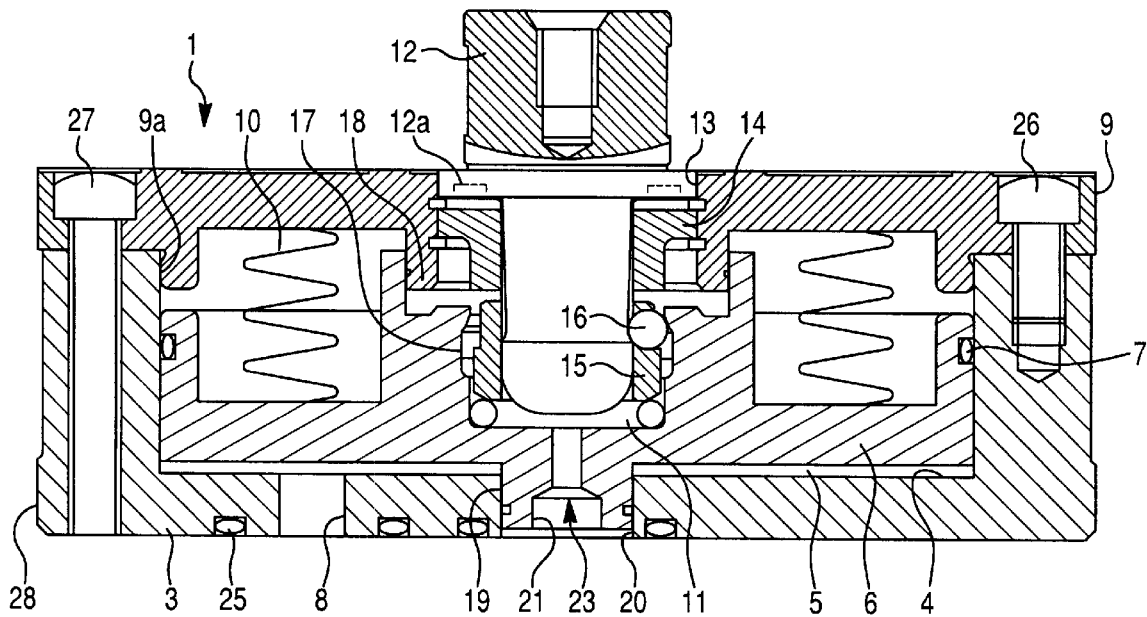
FIG. 1 shows an embodiment of a clamping device according to the present invention with the draw-in bolt inserted and clamped in place, in longitudinal section.

Clamping device 1, which can be installed on a machine table, base plate, or the like, comprises a bushing 3, configured as a cylinder, which is open at its upper end and is inserted into a recess of the machine table. A piston 6 is inserted in axially movable fashion into cylinder bore 4 of bushing 3 forming a pressure chamber 5, the annular gap between cylinder bore 4 and piston 6 being sealed by an O-ring 7. Opening into the bottom of cylinder bore 4 is a hydraulic medium conduit 8 configured in bushing 3, through which a hydraulic medium such as, for example, oil can be delivered to pressure chamber 5 via a delivery line provided in machine table 2. A sealing element 25 which prevents oil leaks is provided between the bottom of bushing 3 and the bottom of recess 2a.

The open upper side of bushing 3 is closed off by a cover 9 that is belted in place and held in centered fashion on bushing 3 by six bolts 26, for which purpose cover 9 has on the bushing side a centering extension 9a that is dimensioned to fit precisely with the inside diameter of bushing 3.

Attachment of clamping device 1 to machine table 2 is also accomplished via the cover, which i s bolted onto the machine table again by way of six bolts 27 which are arranged alternatingly with bolts 26 and which penetrate axially through bushing 3. Cover 9 engages into the recess of the machine table in such a way that it terminates approximately flush with the table edge. Cover 9 is held centeredly in the recess, for which purpose the outer rim of cover 9 is configured as a centering rim that forms a fit with a corresponding centering surface of the recess. The enveloping surface of bushing 3 furthermore has, in its lower region, a centering surface 28 that also forms a fit with a corresponding centering surface of the machine table recess. This centering surface 28 in the lower region of bushing 3 can also be used to position the clamping device when the latter is to be secured to the machine table surface as a surface-mount cylinder.

The recess can also have a diameter that is enlarged in defined fashion, thus making it possible to bring the cylinder even more exactly into bore gauge accuracy by filling.

Also arranged between cover 9 and piston 6 is a cup spring packet 10 (indicated only schematically), which acts upon piston 6 in the direction of the bottom of cylinder bore 4.

Provided in the upper side of piston 6 opposite pressure chamber 5 is a blind hole which for ms a receptacle 11 for a draw-in bolt 12 that is inserted into receptacle 11 through a passthrough hole 13 provided in cover 9. A sleeve-shaped guide element 14 is provided in passthrough hole 13 to facilitate and guide this insertion operation, and the upper region of passthrough hole 13 is dimensioned to fit a flange 12a of draw-in bolt 12 for exact positioning of draw-in bolt 12 in clamping device 1.

A clamping mechanism is provided for securing draw-in bolt 12 in receptacle 11. In a manner known per se, this mechanism comprises a ball cage 15, inserted into receptacle 11, in which multiple balls 16 are held in radially displaceable fashion and can slip outward, depending on the piston position, into a groove 17 in the wall of receptacle 11 so that a draw-in bolt 12 can be inserted into and taken out of ball cage 15, or can be prevented from such slippage by the wall of receptacle 11 and thus held in engagement with the corresponding mating surface on draw-in bolt 12, as depicted in the drawing.

Figure 2:
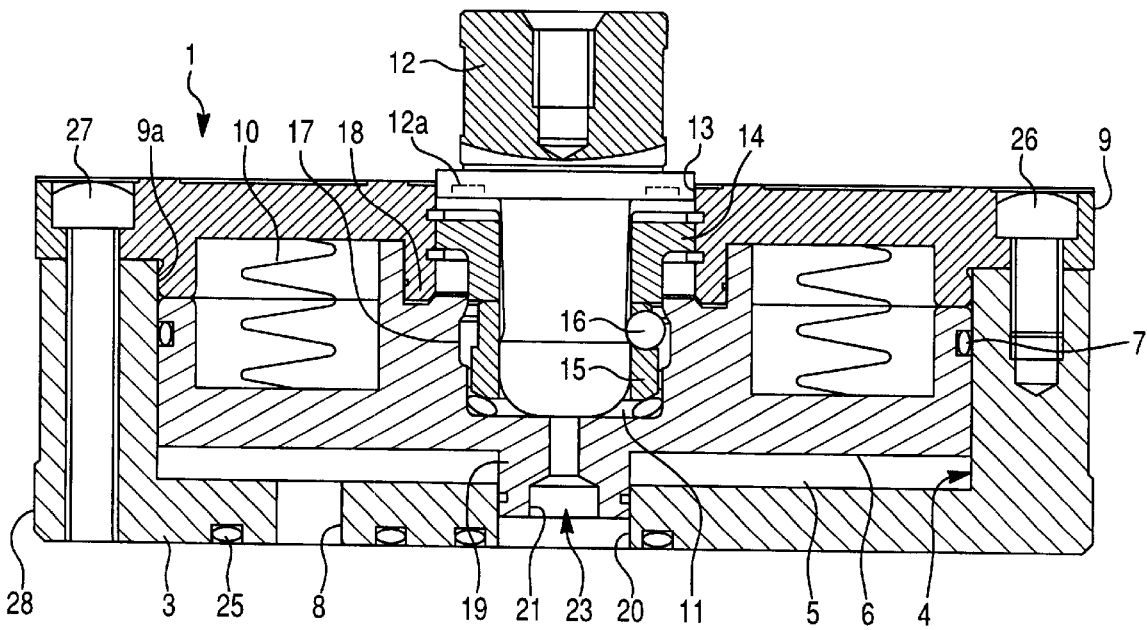
FIG. 2 shows the clamping device of FIG. 1 with the clamping mechanism disengaged.

In the drawings, FIG. 1 shows clamping device 1 in its clamped position, in which pressure chamber 5 is pressureless and piston 6 is being pressed downward by cup spring packet 10, so that an upper oblique surface 18 of groove 17 holds balls 16 in engagement with draw-in bolt 12. When pressure chamber 5 is then acted upon with pressure medium is via hydraulic medium conduit 8, piston 6 is pushed against the return force of cup spring packet 10 upward into the position shown in FIG. 2, in which groove 17 allows balls 16 room to slip radially outward, so that draw-in bolt 12 can be removed from clamping device 1 or inserted back into it The stroke length of piston 6 is, in this context, selected such that draw-in bolt 12 is pressed upward by the bottom of receptacle 11 in order to facilitate the removal of draw-in bolt 12.

On its end surface facing the pressure chamber, piston 6 has an extension 19 which is guided displaceably in a recess 20 configured in the bottom of cylinder bore 4 and is sealed with respect thereto. Recess 20 forms, together with a conduit segment 21 of nozzle-like configuration that is provided in extension 19 and connects recess 20 to the bottom of receptacle 11 for draw-in bolt 12, and with a conduit segment extending in machine table 2, an air inlet conduit 23 that is connected to a compressed-air source (not depicted). As a draw-in bolt 12 is being inserted into or removed from clamping device 1, compressed air can be blown through this air inlet conduit 23 into receptacle 11 so as thereby to keep receptacle 11, with the ball case and draw-in bolt 12, clear of chips or other contaminants, especially in the region of the fitting surfaces and the clamping mechanism. Contamination-related adverse effects on system accuracy can thereby reliably be avoided.

What is claimed is:

1. A clamping device (1) for securing a draw-in bolt (12) to a machine table or a base plate having a piston (6) axially displaceable in a recess of the machine table and being hydraulically actuable, and having a cover (9), secured to the machine table, in order to close off the recess in the machine table, the piston (6) and the cover (9) forming a receptacle (11) into which a draw-in bolt (12) can be inserted through the cover (9) and in which it can be secured by way of a clamping mechanism actuable by displacement of the piston (6), characterized in that there is inserted into the machine table recess an integral bushing (3) in which the piston (6) and cover cooperate and form a pressure chamber (5), the cover (9) being attached to the bushing and to the machine table by way of multiple bolts (27) passing axially through the cover and the bushing (3) and into the machine table, and at least one of the busing (3) and the cover (9) having centering surfaces (28) for positioning on the,machine table or the base plate.

2. The clamping device as defined in claim 1, characterized in that the cover (9) has an outer rim and a centering extension (9a) that engages into the bushing (3).

3. The clamping device as defined in claim 1, characterized in that a sealing element is arranged between the cover (9) and the bushing (3).

4. The clamping device as defined in claim 1, characterized in that the cover (9) is bolted to the bushing (3).

5. The clamping device as defined in claim 1, characterized in that the cover (9) can be at least partially countersunk into the machine table.

6. The clamping device as defined in claim 5, characterized in that the cover (9) can be completely countersunk into the machine table so that it terminates flush with the table surface.

7. The clamping device as defined in claim 1, characterized in that a centering surface (28) and the bushing form a fit with a corresponding centering surface of the recess in the machine table.

8. A flush mount clamping device for securing a draw-in bolt to a base element, comprising:
- a bushing positioned in a recess of a base element configured to receive said bushing;
- a hydraulically actuable piston, said piston being axially displaceable in said bushing and cooperating with said bushing to form a pressure chamber;
- a clamping mechanism actuable by displacement of said piston for fastening a draw-in bolt;
- a cover centered on and secure to said bushing and closing off the base element recess, said cover and said piston form a receptacle into which the draw-in bolt can be inserted through said cover and secured by said clamping mechanism; and
- a plurality of bolts securing said cover to the base element, said bolts passing axially through said cover and said bushing and into the base element.

9. The clamping device of claim 8, wherein a centering surface extends from said bushing.

10. The clamping device of claim 9, wherein said bushing has spaced first and second surfaces, said centering surface proximate one of said first and second surfaces.

11. The clamping device of claim 10, wherein said cover is proximate said first surface and said centering surface is proximate said second surface.

12. The clamping device of claim 11, wherein a side wall extends between said first and second surfaces, said centering surface extends along said side wall intermediate said first and second surfaces.

13. The clamping device of claim 12, wherein said cover has a centering surface that engages said bushing.

14. The clamping device of claim 13, wherein a centering extension extends from said cover and centers said cover in the base element recess.

15. The clamping device of claim 14, wherein said cover is countersunk into the base element.

16. The clamping device of claim 8, wherein a sealing element is arranged between said cover and said bushing.

17. The clamping device of claim 8, wherein said cover is secured to said bushing by a second plurality of bolts passing axially into said bushing.

18. The clamping device of claim 17, wherein said second plurality of bolts are arranged alternatingly with said first mentioned plurality of bolts.

19. The clamping device of claim 18, wherein said second plurality of bolts are countersunk into said cover.

20. A clamping device comprising:
- a base clement having a centering surface;
- a bushing having a side wall, said bushing positioned in a recess of said base element configured to receive said bushing;
- a hydraulically actuable piston axially displaceable in said bushing and cooperating with said bushing to form a pressure chamber;
- a cover secured to said bushing and closing off said recess;
- a centering surface extending from at least one of said cover and said bushing for centering relative to said base element;
- a clamping mechanism actuable by displacement of said piston for fastening a draw-in bolt which can be inserted through said cover and secured by said clamping mechanism;
- a first plurality of bolts securing said cover to said bushing, said first plurality of bolts passing axially into said bushing; and
- a second plurality of bolts securing said cover to said base element, said second plurality of bolts passing axially through said cover and said bushing and into said base element.

* * * * *